US006724174B1

(12) United States Patent
Esteves et al.

(10) Patent No.: US 6,724,174 B1
(45) Date of Patent: Apr. 20, 2004

(54) ADJUSTABLE MINIMUM PEAK INDUCTOR CURRENT LEVEL FOR BURST MODE IN CURRENT-MODE DC-DC REGULATORS

(75) Inventors: Joey Martin Esteves, Tracy, CA (US); Randy Guy Flatness, Los Gatos, CA (US)

(73) Assignee: Linear Technology Corp., Milpitas, CA (US)

( * ) Notice: Subject to any disclaimer, the term of this patent is extended or adjusted under 35 U.S.C. 154(b) by 0 days.

(21) Appl. No.: 10/243,526

(22) Filed: Sep. 12, 2002

(51) Int. Cl.[7] ............................................... G05F 1/40
(52) U.S. Cl. ...................... 323/224; 323/284; 323/285
(58) Field of Search ................................. 323/224, 284, 323/285, 282

(56) References Cited

U.S. PATENT DOCUMENTS

| | | | | | |
|---|---|---|---|---|---|
| 5,528,125 A | * | 6/1996 | Marshall et al. | ............ | 323/222 |
| 5,745,352 A | * | 4/1998 | Sandri et al. | ................. | 363/41 |
| 5,773,966 A | * | 6/1998 | Steigerwald | ................ | 323/284 |
| 6,127,815 A | * | 10/2000 | Wilcox | ........................ | 323/282 |
| 6,215,288 B1 | * | 4/2001 | Ramsey et al. | ............. | 323/224 |
| 6,366,066 B1 | * | 4/2002 | Wilcox | ........................ | 323/282 |

* cited by examiner

*Primary Examiner*—Shawn Riley
(74) *Attorney, Agent, or Firm*—Fish & Neave; Joel Weiss; George L. Kanabe (57) ABSTRACT

Switching regulator circuits and methods are provided for regulating output voltage that include an adjustable minimum peak inductor current level for Burst Mode in current-mode DC-DC regulators. Minimum peak inductor current level control is achieved during Burst Mode by allowing external control for adjusting the burst threshold level. A single pin can be used to distinguish between forced continuous and Burst Mode as well as set the burst threshold level during Burst Mode, or an alternate method of setting a variable burst threshold level can be implemented in which two pins are used, one for selecting the mode of operation and the other for setting the burst threshold level during Burst Mode. The above principles can be applied to both step-up and step-down regulator circuit configurations, as well as both synchronous switching regulators and non-synchronous switching regulators.

30 Claims, 5 Drawing Sheets

ADJUSTABLE MINIMUM PEAK INDUCTOR CURRENT LEVEL FOR BURST MODE IN CURRENT-MODE DC-DC REGULATORS

BACKGROUND OF THE INVENTION

The present invention relates to voltage regulators. More particularly, this invention relates to circuits and methods that provide the ability to adjust the minimum peak inductor current level for Burst Mode™ (hereinafter, "Burst Mode") in current-mode DC-DC regulators (i.e. regulators that respond to measurements of the output current).

Voltage regulators are power supply circuits that use a closed loop design to provide a predetermined and substantially constant output voltage, even while using an input voltage source which may be poorly specified or fluctuating. Furthermore, many electronic products use voltage regulators to convert an input voltage into a regulated output voltage that may be higher or lower than the input voltage. Accordingly, voltage regulators function as both a voltage converter in addition to a voltage stabilizer.

There are two major types of regulators: linear regulators and switching regulators. In a typical linear regulator, the output voltage is regulated by adjusting a passive element (e.g., a variable resistor) to control a continuous flow of current from the voltage source to the load.

Switching regulators, on the other hand, are essentially DC-DC converters that operate by switching current ON and OFF to control the output voltage. Switching voltage regulators typically employ one or more switching devices, along with an inductor and a capacitor in order to store and transfer energy to a load. These regulators are able to regulate the voltage being supplied to the load by turning the switching element(s) ON and OFF, thereby controlling the amount of power being transmitted through the inductor in the form of discrete current pulses. The inductor and the capacitor convert the supplied current pulses into a steady load current so that the load voltage is regulated. Ultimately, regulation of the output voltage is achieved through adjustment of the switch ON-OFF timings based on feedback signals indicative of the output voltage and load current.

Switching regulators that operate in current-mode are particularly desirable. They provide good line and load transient signal rejection, and possess inherent current-limiting capabilities during fault conditions (e.g., output short circuits). Current-mode switching regulators typically monitor the inductor current and compare it with a peak inductor current level to determine when it is appropriate to turn OFF the main switching element, thereby eliminating the supply of excess current.

Normally, current-mode switching regulator circuits include the following: a logic section, an output switch or switches controlled by the logic section, an oscillator for providing periodic timing signals to turn ON the main switch, a current amplifier that relays a sense voltage that is dependent on the inductor current, an error amplifier that adjusts its output voltage depending on load conditions, and a current comparator producing a signal which causes the logic section to turn OFF the main switch when the sense voltage increases above the voltage emerging from the error amplifier.

A particular type of regulator which often operates in current-mode as described above is the synchronous switching regulator. These regulators have a main switching element and a synchronous switching element which are driven out of phase with respect to each other in order to supply current at a regulated voltage to a load. Synchronous switching regulators differ from non-synchronous switching regulators in that a diode is replaced with a synchronous switching element, and the result, typically, is decreased power loss in the switching regulator.

A major benefit of switching regulators, such as synchronous switching regulators, is that they typically exhibit greater efficiency (where efficiency is defined as the ratio of the power provided by the regulator to the power provided to the regulator) than can be found in linear regulators, thereby leading to significant reductions in unwanted heat dissipation. As a result, many switching regulators can eliminate the use of a heat sink that an equivalent linear design would require.

In particular, synchronous switching regulators that employ MOSFET (metal-oxide semiconductor field-effect transistor) switches are widely used in portable battery-powered electronic products and products in which only limited heat generation can be tolerated. Because these voltage regulators exhibit higher efficiency, they provide relatively long battery life with little heat generation. For this reason, these regulators are often employed in systems such as cellular telephones, cordless telephones, personal pagers, laptop computers, and wireless modems.

The efficiency of switching regulators, however, is not always maximized and varies proportionally to the size of the load. It is a function of output current and typically decreases when the switching regulator is providing small amounts of current to the load. This occurs because even as the load decreases, a fixed amount of power is dissipated in the drive circuitry irrespective of the load size.

The above described loss of efficiency at lighter loads is common in switching regulators that operate in a forced continuous mode of operation. In forced continuous mode, the efficiency loss at lighter loads for switching regulators becomes greater because the main switch is periodically turned ON and OFF regardless of operating conditions. Therefore, these regulators may become inefficient for smaller loads because of the energy, in the form of gate charge, that is required to constantly turn the main switch and synchronous switch ON and OFF regardless of load conditions.

An effective alternative to operating in forced continuous mode is to allow the regulator to enter Burst Mode operation. When operating in this mode, the regulator may omit switching cycles when the load is light, thereby reducing transistor gate charge losses. This is possible because, when operating in Burst Mode, the switching transistor(s) and other unneeded portions of the regulator circuit are made to remain OFF as the load current drops below a specified value. This technique is therefore used to reduce switching losses in a switching regulator and increase the operating efficiency at low output current levels.

Available regulators capable of operating in Burst Mode use essentially the same circuitry as described above for typical switching regulators, with the addition of a burst comparator and circuitry that provides a burst threshold level. This additional circuitry may be used to shut down the majority of a regulator circuit under specified conditions in order to reduce power consumption. Examples of regulators that use Burst Mode and forced continuous mode are Linear Technology Corp.'s LTC1435 and LTC1735 series products.

A disadvantage of prior Burst Mode type regulators results from the inability to externally control the burst threshold level, which sets the minimum peak inductor current level (the level below which the circuit enters into Burst Mode). For higher burst threshold levels, the efficiency at light loads is higher at the expense of higher output voltage ripple (an undesirable characteristic). For lower burst threshold levels, the output voltage ripple is lower at the expense of slightly reduced efficiency for light loads. Accordingly, because the burst threshold level, which sets the minimum peak inductor current level, is fixed internally in current regulators that operate in Burst Mode, the output voltage ripple and efficiency of a regulator cannot be tailored to fit the requirements of different applications.

In view of the foregoing, it would be desirable to provide a circuit and method for varying the peak inductor current level for Burst Mode in current-mode DC-DC converters to optimize efficiency of a regulator, and to allow the voltage ripple of the regulated output voltage to be adjusted over a continuous range of values.

SUMMARY OF THE INVENTION

It is therefore an object of the present invention to provide a technique for varying the burst threshold level, thereby also allowing the selection of a desired minimum peak inductor current level, for current-mode switching regulators operating in Burst Mode.

In accordance with this and other objects of the present invention, switching voltage regulator circuitry with an externally adjustable peak inductor current level is described. The circuitry can operate in either step-up (boost) or step-down (buck) configurations, with minor modifications, in any regulator that utilizes Burst Mode operation.

One embodiment of the current invention improves on prior regulators by incorporating a single pin that is used for selecting the mode of regulator operation (either forced continuous mode or Burst Mode) as well as setting the burst threshold level during Burst Mode operation.

Another embodiment of the present invention provides an alternate method of implementing a variable peak inductor current level through the use of two pins. One pin is used for selecting between forced continuous mode and Burst Mode, and another pin for setting the burst threshold level during Burst Mode operation.

The above embodiments preferably alleviate the problems associated with using a fixed minimum peak inductor current level for current control. Accordingly, the present invention allows the output voltage ripple and efficiency of a switching regulator to be adjusted to fit different application requirements.

BRIEF DESCRIPTION OF THE DRAWINGS

The above and other advantages of the present invention will become apparent upon consideration of the following detailed description, taken in conjunction with the accompanying drawings, in which like reference characters refer to like parts throughout, and in which.

DETAILED DESCRIPTION OF THE INVENTION

This invention relates to switching voltage regulators with an externally adjustable minimum peak inductor current level for Burst Mode in current-mode DC-DC regulators.

In the past, typical switching voltage regulators used a fixed burst threshold level, thereby causing the minimum peak inductor current level to be set at a particular value. This is disadvantageous because the output voltage ripple and efficiency of a regulator cannot be customized to fit different application requirements.

Figure 1:
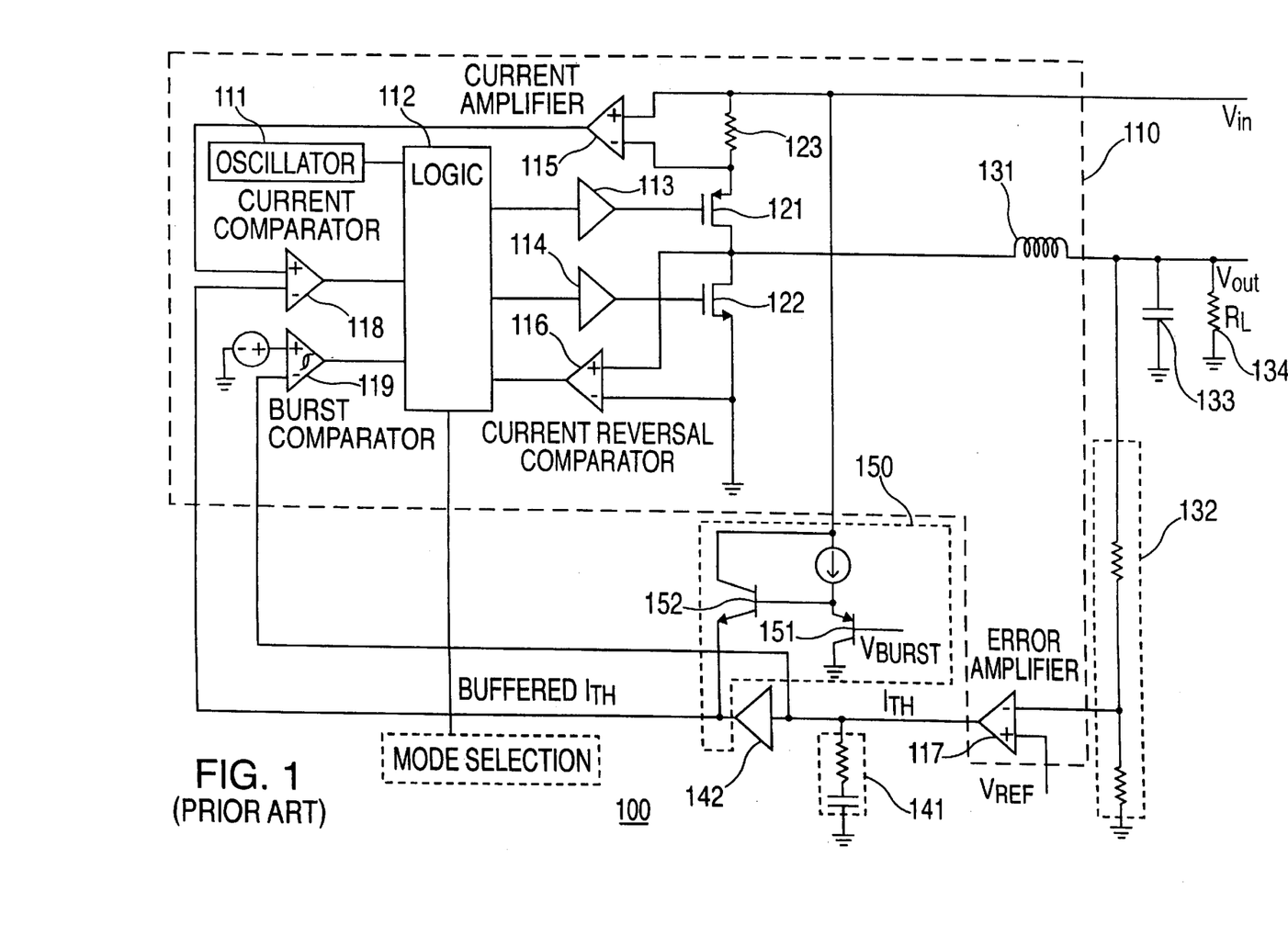
FIG. 1 is a circuit diagram of a conventional step-down switching voltage regulator.

A typical prior current-mode step-down synchronous switching voltage regulator 100 employing Burst Mode operation that operates with a fixed burst threshold level is shown in FIG. 1, and operates as follows.

Voltage regulator 100 of FIG. 1 uses oscillator 111 (together with the other components described below that comprise control circuitry 110), or any other suitable device which is capable of providing the circuit with switch timing (i.e., by generating a narrow pulse at a constant frequency). Regulator 100 also contains logic 112, which may be a pulse-width modulator (PWM) circuit or any other suitable circuit capable of driving switch drivers 113 and 114, thereby controlling the duty cycle of main power switch 121 (i.e., the amount of time switch 121 is ON compared to the period of an ON/OFF cycle). At the beginning of each cycle, the oscillator pulse originating from oscillator 111 propagates through logic 112, causing main switch driver 113 to turn ON main switch 121 and also causing driver 114 to turn OFF synchronous switch 122. This in turn creates a voltage differential of approximately Vin-Vout across inductor 131. As a result, the current through inductor 131 increases linearly, and a greater amount of current is supplied to the load (modeled by resistor 134). It should be noted that although MOSFETs are used for the switching elements in this invention, any other type of suitable switching element may be used without departing from the principles of the present invention.

When main switch 121 is ON, the inductor current flows through sense resistor 123, developing a sense voltage across it equaling the product of the inductor current and the value of sense resistor 123. This voltage is then amplified by current amplifier 115 and compared to the buffered Ith voltage, which is controlled by error amplifier 117 (as explained below). When the amplified sense voltage increases above the buffered Ith voltage, current comparator 118 trips and signals logic 112 to cause drivers 113 and 114 to simultaneously turn main switch 121 OFF and synchronous switch 122 ON, respectively. This changes the voltage across inductor 131 to approximately −Vout, causing the inductor current to decrease until the next oscillator pulse once again turns main switch 121 ON and synchronous switch 122 OFF.

The voltage at Ith, which controls the peak inductor current at which current comparator 118 trips and causes main switch 121 to be shut OFF, is adjusted by error amplifier 117. The error amplifier 117 senses the output voltage of the regulator and adjusts the Ith voltage accordingly. The Ith signal is then stabilized by compensation circuit 141, comprising a resistor and a capacitor, and coupled to the input of current comparator 118 through voltage buffer 142.

Error amplifier 117 operates by comparing a feedback signal voltage Vfb obtained from resistor divider 132 to a reference voltage Vref. When a large load step is applied to voltage regulator 100, the load current drawn from regulator 100 increases. This causes a reduction in the value of Vfb relative to Vref, resulting in error amplifier 117 raising the voltage at Ith. This results in the average inductor current ultimately being raised to a point where it matches the new load current.

Conversely, when the demand for load current decreases, there is an increase in Vfb relative to Vref. This causes error amplifier 117 to reduce the voltage at Ith. As a result, although main switch 121 continues to switch ON at the same frequency (i.e., at the beginning of each cycle), its duty cycle is decreased, and therefore, it conducts less current as the load current decreases. This process continues and Ith is reduced until the average inductor current decreases enough so that it is equal to the new load current.

Moreover, the regulator of FIG. 1 enables the selection of either forced continuous or Burst Mode operation through the use of an external pin. Forced continuous operation reduces noise and RF interference and minimizes output voltage ripple while Burst Mode operation provides higher efficiency by reducing transistor gate charge losses at light loads.

When operating in forced continuous mode, the inductor current is allowed to become negative and the circuit behaves in the manner described above. When the main switch 121 shuts OFF, the synchronous switch 122 turns ON, and remains ON, until the next oscillator pulse triggers the main switch to return to the ON state.

Alternatively, main switch 121 can be made to remain OFF when the regulator is operating in Burst Mode and certain conditions are met. In Burst Mode, main switch 121 and synchronous switch 122 operate intermittently at light loads in order to increase efficiency by minimizing switching losses. Additionally, in Burst Mode, the current reversal comparator 116 is enabled and the inductor current is not allowed to become negative. Current reversal comparator 116 monitors the current flowing through synchronous switch 122 and signals logic 112 to shut OFF synchronous switch 122 when the inductor current becomes negative.

During Burst Mode operation, transistors 151 and 152 of burst clamp circuitry 150 clamp the minimum value of the buffered Ith voltage at the burst threshold level, thereby setting the minimum peak inductor current level, Iburst. The voltage on Ith is then monitored by burst comparator 119 to determine when sleep mode is enabled and disabled. When main switch 121 turns ON, the inductor current has to increase to Iburst before it can shut OFF. Then, as the output load current drops, the peak inductor current decreases to keep the output voltage in regulation. When the load current demanded drops to a current less than Iburst minus one half of the ripple current in the inductor, however, the burst threshold forces the peak inductor current to remain equal to Iburst. Since the average inductor current is greater than the output load current, the voltage on Ith will be reduced by error amplifier 117 until the burst comparator 119 trips. When burst comparator 117 trips, sleep mode is enabled and both power switches 121 and 122, along with most of the remaining circuitry, are shut OFF to minimize power consumption. At this point, the load current is solely supplied by output capacitor 133. When the output voltage drops, causing the voltage at Ith to increase by the amount of the hysteresis in burst comparator 119, sleep mode is de-asserted and normal operation is resumed.

One limitation of the circuitry in FIG. 1 is the inability to change the burst threshold level. It is therefore not possible to vary the minimum peak inductor current level of regulator 100 when it is operating in Burst Mode in order to customize the sleep period between pulses or the output voltage ripple as may be necessary to achieve a certain level of efficiency for a specific application.

Figure 2:
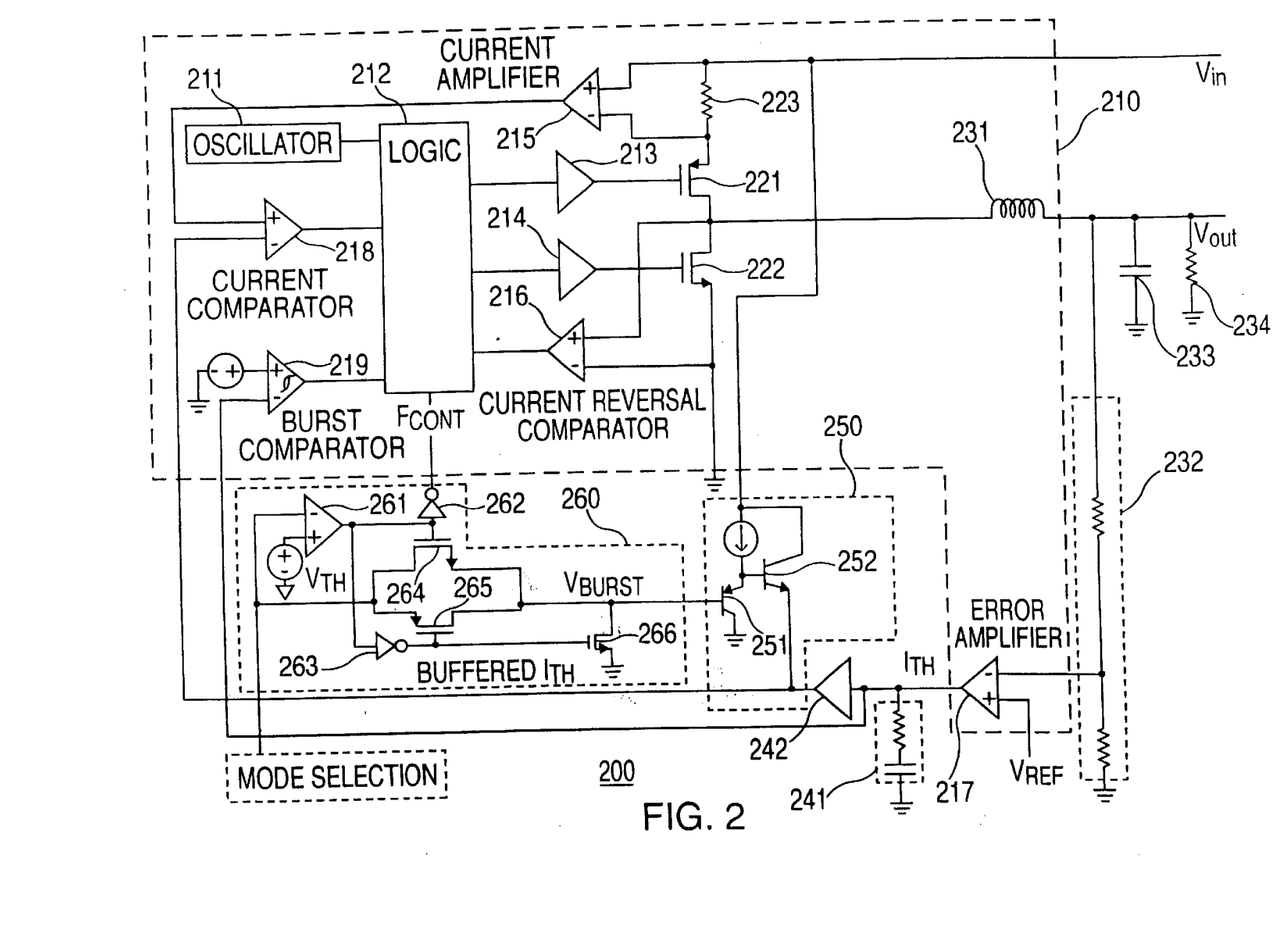
FIG. 2 is a circuit diagram of an embodiment of a step-down switching voltage regulator with an adjustable minimum peak inductor current level for Burst Mode in accordance with the principles of the present invention.

FIG. 2 shows one embodiment of a step-down current-mode switching voltage regulator with an adjustable minimum peak inductor current level for Burst Mode operation according to the principles of the present invention. Operating under forced continuous, FIG. 2 functions as follows.

Oscillator 211 provides the switch timing mechanism, turning main switch 221 ON and synchronous switch 222 OFF at the beginning of each cycle. A sense voltage resulting from the inductor current flowing through resistor 223 is amplified by current amplifier 215, the output of which is used as one of the inputs to current comparator 218. Error amplifier 217 compares a feedback voltage with a reference voltage to raise or lower the Ith voltage as necessary, providing the second input to current comparator 218 which serves to signal the main switch 221 to be turned OFF when the inductor current increases greater than the current level set by Ith.

Moreover, the aforementioned limitation of conventional regulators operating in Burst Mode is overcome by the present invention in the following manner. The regulator in FIG. 2 preferably incorporates a single external pin for the purpose of selecting the mode of operation (either Burst Mode or forced continuous mode) as well as setting the burst threshold level during Burst Mode operation.

In FIG. 2, the FCONT signal is used to instruct logic 212 as to whether switching regulator 200 should operate in forced continuous mode or Burst Mode. In one embodiment, when FCONT is a logic HIGH, the mode of operation is set to forced continuous. Conversely, when FCONT is a logic LOW, the regulator enters Burst Mode. In addition, as shown in FIG. 2, Vburst is used to set the burst threshold level, thereby also controlling the minimum peak inductor current level.

Mode selection circuitry 260, comprising mode comparator 261 having a MODE selection input and a threshold voltage input, a transmission gate consisting of n-channel transistor 264 and p-channel transistor 265, inverters 262 and 263 and additional n-channel transistor 266, provides the FCONT and Vburst signals to logic 212 and burst clamp circuitry 250, respectively. When the voltage at MODE is above the threshold voltage Vth, the output of mode comparator 261 is LOW. This causes the output of inverter 262 to make the signal at FCONT a logic HIGH, causing the regulator to operate in forced continuous mode. In addition, the LOW output of mode comparator 261 also shuts OFF n-channel transistor 264 and p-channel transistor 265, and the gate of n-channel transistor 266 is driven HIGH to bring the burst threshold level to 0 Volts.

Alternatively, when the voltage at MODE is less than Vth, the output of mode comparator 261 becomes HIGH. In this case, the output of inverter 262 makes the signal at FCONT a logic LOW, thereby bringing the regulator into Burst Mode. In this state, n-channel transistor 264 and p-channel transistor 265 of the transmission gate are turned ON and n-channel transistor 266 is turned OFF. Because the transmission gate is turned ON, Vburst becomes substantially equivalent to the voltage being applied at MODE. Accordingly, during Burst Mode, the voltage at MODE may be varied to adjust the burst threshold level as desired. Moreover, through varying the burst threshold level, it is possible to adjust the minimum peak inductor current level Iburst as necessary. This gives the user the ability to set the output voltage ripple and efficiency of regulator 200 during light loads to satisfy applications with varying requirements.

In order to achieve a compromise between low output voltage ripple and efficiency, it is also possible to produce pulse skipping behavior while in Burst Mode. This can be accomplished by connecting the MODE pin to ground. This sets the burst threshold level at 0 Volts, and sets Iburst to 0 Amperes. In this condition, the peak inductor current is limited by the minimum on-time of the current comparator. If the load demand is less than the average of the minimum on-time inductor current, switching cycles will be skipped to keep the output voltage in regulation.

Figure 3:
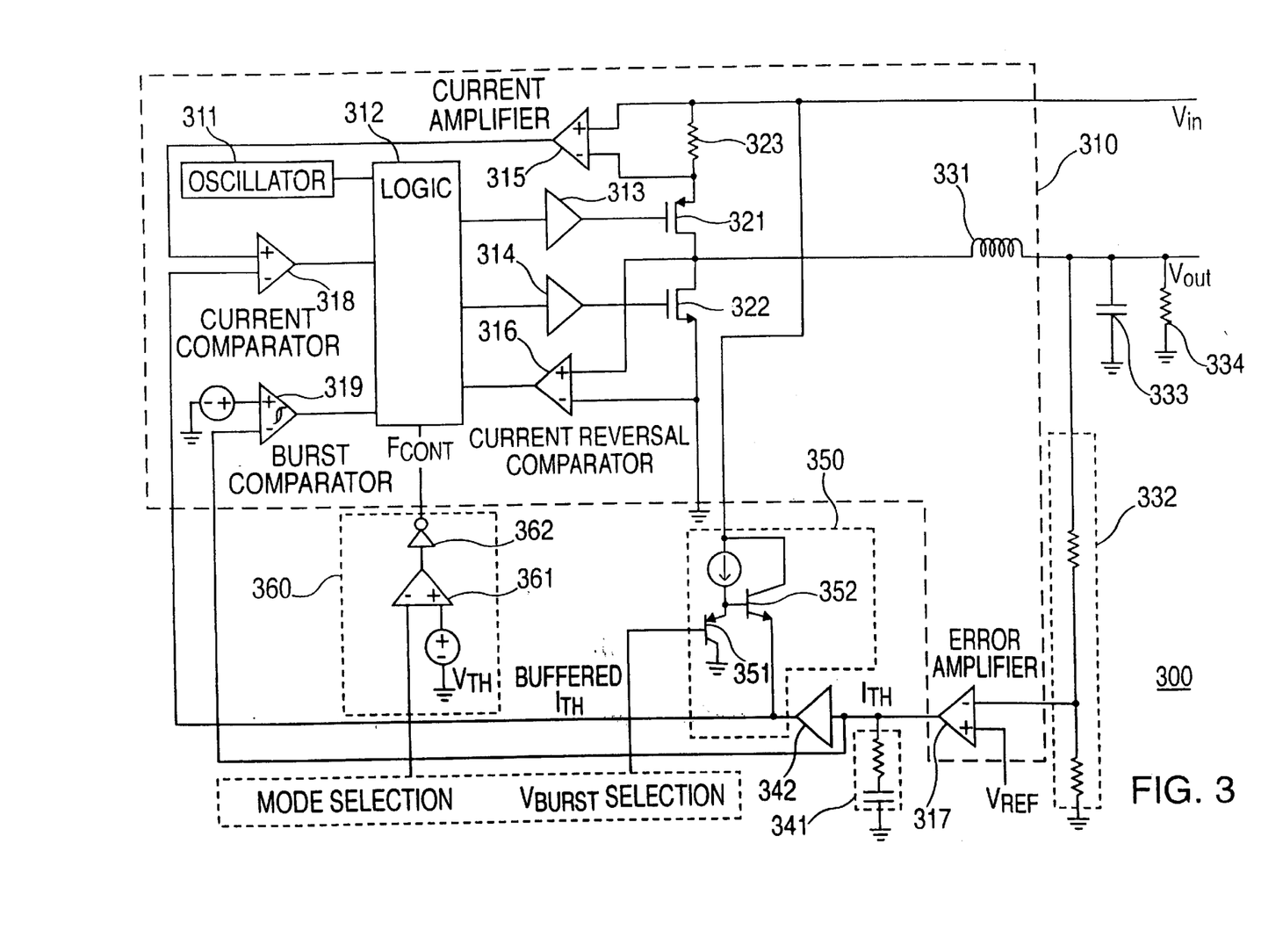
FIG. 3 is a circuit diagram of an alternate embodiment of a step-down switching voltage regulator with an adjustable minimum peak inductor current level for Burst Mode in accordance with the principles of the present invention.

Another embodiment of the present invention is shown in FIG. 3, wherein two pins are used to implement a variable burst threshold level for Burst Mode. The regulator shown in FIG. 3 functions similarly to that shown in FIG. 2, except for the portion of the circuit responsible for controlling whether regulator 300 operates in forced continuous mode or Burst Mode, as well as setting the voltage threshold level during Burst Mode operation.

When a voltage above the threshold voltage Vth is applied at MODE to mode comparator 361 of mode selection circuitry 360, the output of mode comparator 361 is LOW. This causes the output of inverter 362 (i.e., the signal at FCONT) to be HIGH, thereby causing the regulator to operate in forced continuous mode. Alternatively, if the voltage applied at MODE is less than Vth, the signal at FCONT is LOW and the regulator enters Burst Mode.

The second pin in FIG. 3 provides a connection to burst clamp circuitry 350 for setting the burst threshold level. In this manner, when the signal applied at MODE causes the regulator to operate in Burst Mode, the burst threshold level can be adjusted in order to manipulate the minimum peak inductor current level, Iburst. Once again, this provides a substantial improvement over the prior art, allowing the user to tailor the output voltage ripple and efficiency of regulator 300 to meet the requirements of a specific application.

It should be noted that, although FIG. 2 and FIG. 3 each show step-down synchronous switching regulator embodiments of the present invention, applicants' invention is not limited in this regard. The benefits of the present invention are equally applicable to other types of regulators, such as step-up synchronous switching regulators, step-up and step-down non-synchronous switching regulators, or any other suitable type of regulator.

Figure 4:
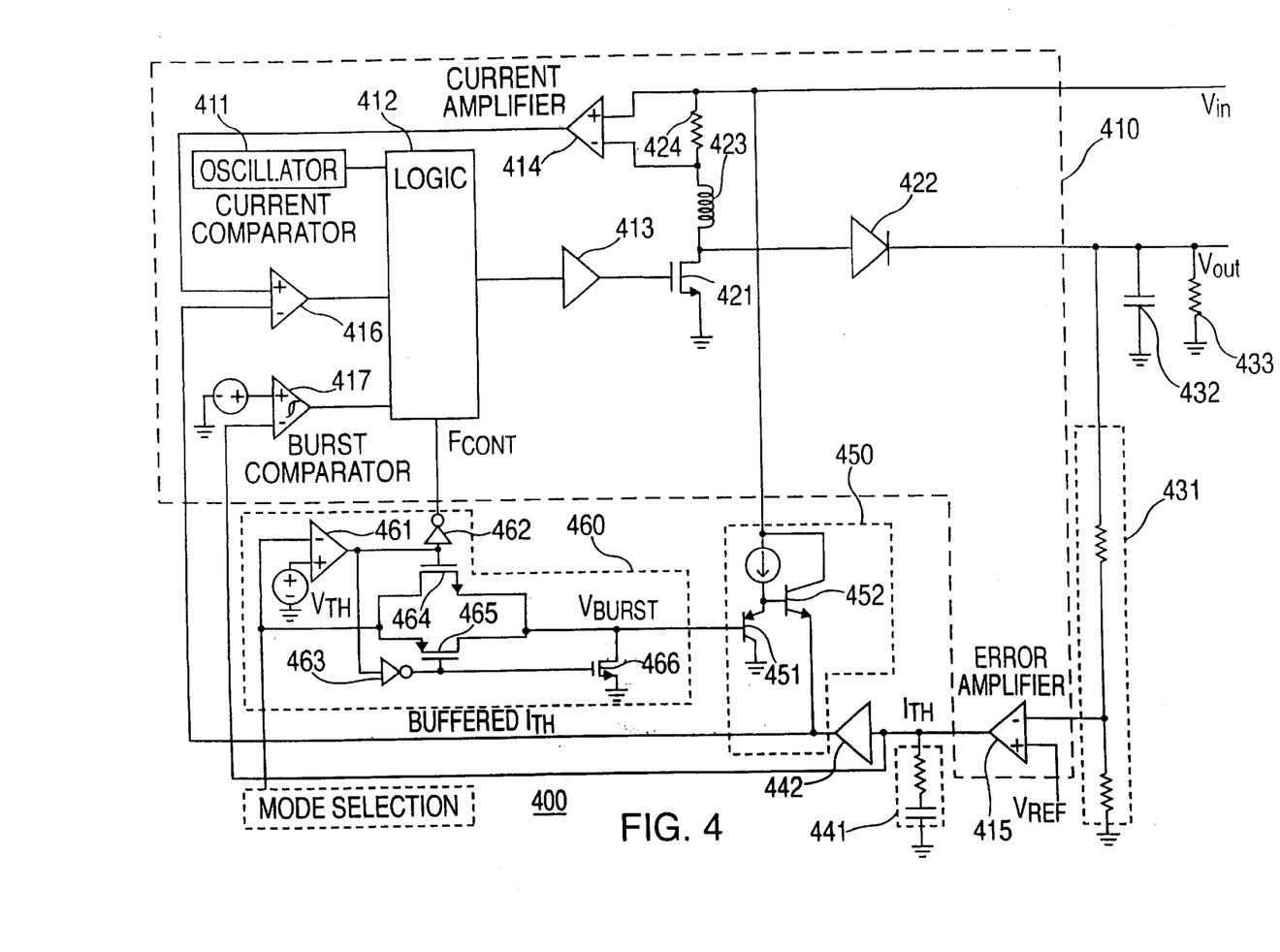
FIG. 4 is a circuit diagram of an embodiment of a step-up switching voltage regulator with an adjustable minimum peak inductor current level for Burst Mode in accordance with the principles of the present invention.

FIG. 4 is a circuit diagram of an exemplary embodiment of a step-up switching voltage regulator with an adjustable minimum peak inductor current level for Burst Mode in accordance with the principles of the present invention. FIG. 4 operates by using primarily the same basic elements (and rearranging their parts) that are present in the step-down regulator shown in FIG. 2. It also utilizes diode 422 to prevent capacitor 432 from discharging to ground. The step-up regulator shown in FIG. 4 functions as described below.

When circuit conditions cause main switch 421 to close, the input voltage is applied across inductor 423. During this charge phase, current begins to flow through inductor 423. Additionally, diode 422 prevents capacitor 432 from discharging to ground, and capacitor 432 is responsible for supplying the load with current.

Once switch 421 opens, capacitor 432 is charged by the energy stored in inductor 423. At this time, an extra current starts flowing through the load, thereby causing the output voltage to rise (energy is also supplied directly from the input source as long as diode 422 is forward biased). After some time period, switch 421 is once again closed. This cycle repeats itself, maintaining the required output voltage level and supplying the required current to the load as necessary.

The remainder of the circuit components in FIG. 4 behave as previously explained for the comparable circuit components found in FIG. 2. Current comparator 416 compares the outputs from current amplifier 414 and error amplifier 415 in order to determine when main switch 421 should be turned OFF.

Furthermore, the MODE selection input determines whether regulator 400 operates in forced continuous mode or Burst Mode, and also sets the burst threshold level when Burst Mode is selected. Mode comparator 461, a transmission gate comprising transistors 464 and 465, transistor 466, and inverters 462 and 463 comprise the mode selection circuitry 460 that provides the signals at FCONT and Vburst, which respectively determine the mode of operation of regulator 400 and (when appropriate) the burst threshold level. As shown in FIG. 4, mode comparator 461 compares the MODE selection input with a threshold voltage, Vth. When the voltage at MODE is above Vth, the output of mode comparator 461 is LOW. This, in turn, causes the output of inverter 462 to make the signal at FCONT a logic HIGH, causing the regulator to operate in forced continuous mode. In addition, the LOW output of mode comparator 461 also shuts OFF n-channel transistor 464 and p-channel transistor 465, and the gate of n-channel transistor 466 is driven HIGH to bring the burst threshold level to 0 Volts.

Alternatively, when the voltage at the MODE selection input is less than Vth, the output of mode comparator 461 becomes HIGH. In this case, the output of inverter 462 makes the signal at FCONT a logic LOW, thereby bringing the regulator into Burst Mode. In this state, the transmission gate comprising n-channel transistor 464 and p-channel transistor 465 is turned ON (both transistors are ON) and n-channel transistor 466 is turned OFF. As a result, Vburst becomes substantially equivalent to the voltage being applied at the MODE selection input, and therefore, the voltage at MODE may be varied during Burst Mode to adjust the burst threshold level as desired. In this manner, it is possible to adjust the minimum peak inductor current level, Iburst, as necessary in order to tailor the output voltage ripple and efficiency of regulator 400 as desired.

Figure 5:
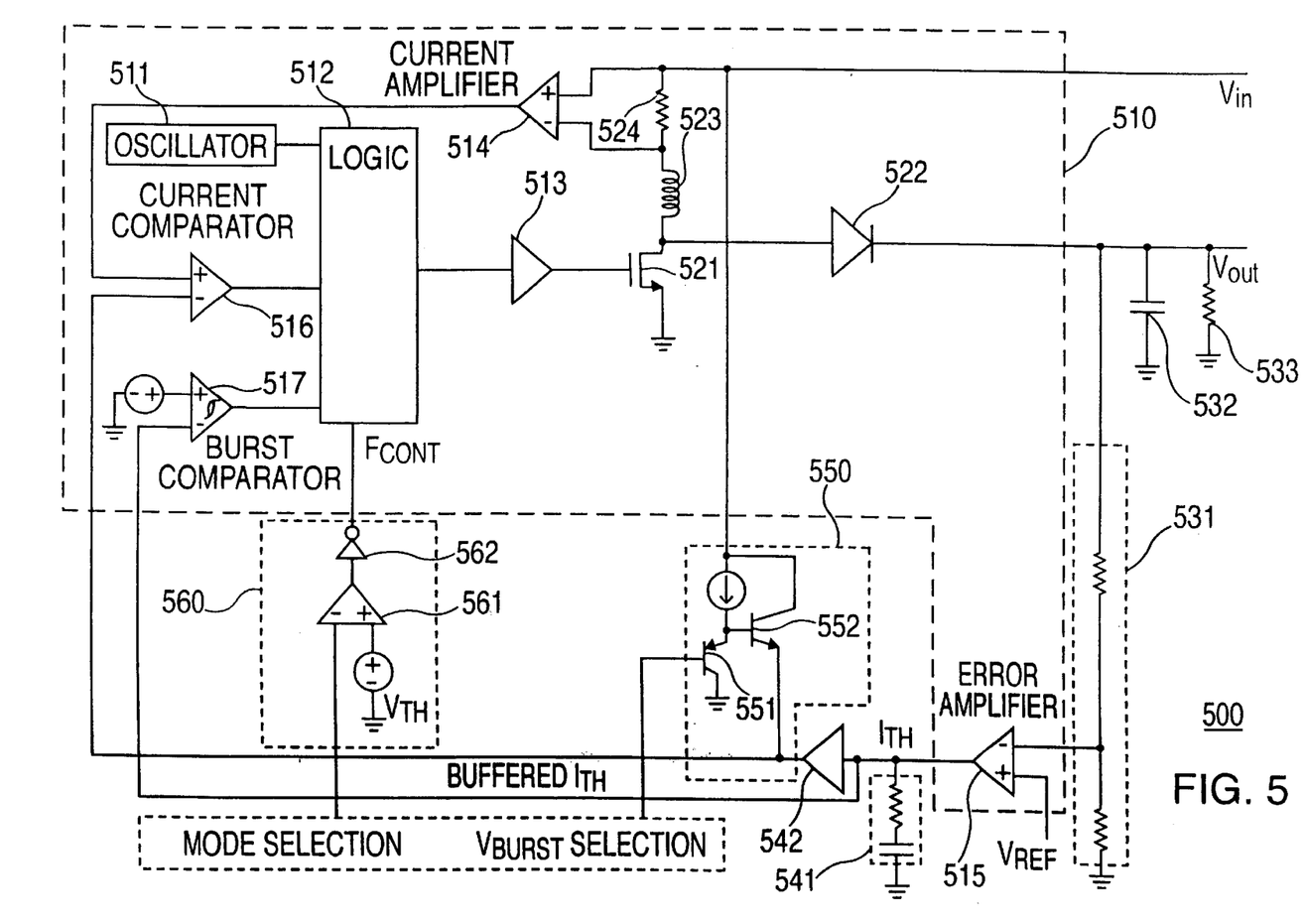
FIG. 5 is a circuit diagram of an alternate embodiment of a step-up switching voltage regulator with an adjustable minimum peak inductor current level for Burst Mode in accordance with the principles of the present invention.

Another embodiment of a step-up switching voltage regulator with an adjustable minimum peak inductor current level for Burst Mode is shown in FIG. 5. The majority of the circuit shown in FIG. 5 operates similarly to the circuit shown in FIG. 4 and described above. Moreover, in accordance with the principles of the present invention, FIG. 5 shows two pins which are used for the selection of the regulator operating mode and setting the burst threshold level.

The operation of regulator 500, in either forced continuous mode or Burst Mode, is selected by supplying a voltage at the MODE selection input. If a voltage above the threshold voltage Vth is applied at the MODE selection input, the output of mode comparator 561 is LOW, and therefore, the output of inverter 562 (i.e., the signal at FCONT) is HIGH. This causes regulator 500 to operate in forced continuous mode. Alternatively, if the voltage applied at the MODE selection input is less than Vth, the signal at FCONT is LOW and the regulator enters Burst Mode.

The second pin (i.e., the Vburst selection input) shown in FIG. 5 provides a user with the ability to set the burst threshold level. When the signal applied at the MODE selection input causes the regulator to operate in Burst Mode, the burst threshold level may be adjusted through the use of the Vburst selection input. In this manner, it is possible to control the minimum peak inductor current level, Iburst.

It should be noted that although FIGS. 2–5 each show a particular embodiment of a regulator in accordance with the principles of the present invention, the present invention is not limited in any way in this respect. The principles of the present invention may be applied to any type of regulator (e.g., step-up synchronous switching voltage regulator), and the benefits of doing so should be understood by one skilled in the art. Moreover, it should known by one skilled in the art that the circuitry used to set the burst threshold level in accordance with the principles of the present invention, as described above, is only exemplary and applicants' invention is not limited in this manner.

What is claimed is:

1. A switching regulator that supplies current at a regulated voltage to a load, said switching regulator that is capable of operating in Burst Mode, said switching regulator comprising:

an input terminal coupled to a source of input supply voltage;

an output terminal coupled to said load;

a control circuit coupled to said input terminal and to said output terminal, said control circuit that regulates the current that is supplied to said load; and a minimum peak adjustment circuit coupled to a mode selection input and to said control circuit, said minimum peak adjustment circuit that adjusts the burst threshold level of said switching regulator when said switching regulator operates in Burst Mode.

2. The switching regulator of claim 1 wherein said switching regulator is a step-down regulator.

3. The switching regulator of claim 2 wherein said switching regulator is a non-synchronous switching regulator.

4. The switching regulator of claim 2 wherein said switching regulator is a synchronous switching regulator.

5. The switching regulator of claim 2 wherein said control circuit comprises:

a logic section;

an inductor coupled to said output terminal and to said control circuit; and a main switch coupled to said logic section, said main switch that is controlled by said logic section.

6. The switching regulator of claim 5 wherein said control circuit further comprises an oscillator coupled to said logic section, said oscillator that provides an oscillatory signal to said logic section.

7. The switching regulator of claim 5 wherein said control circuit further comprises an error amplifier coupled to said output terminal, said error amplifier that adjusts its output voltage depending on load conditions.

8. The switching regulator of claim 5 wherein said control circuit further comprises:

a current comparator coupled to said logic section, said current comparator that produces a signal, said signal that instructs said logic section to turn OFF said switching element when a sense voltage increases above the output voltage of said error amplifier; and a current amplifier coupled to said current comparator, said current amplifier that provides said current comparator with said sense voltage indicative of the current that flows through said inductor.

9. The switching regulator of claim 5 wherein said control circuit further comprises a burst comparator coupled to said logic section, said burst comparator that produces a signal, said signal that causes said switching regulator to enter into sleep mode when the voltage output from said error amplifier drops below a burst threshold level.

10. The switching regulator of claim 5 wherein said control circuit further comprises a synchronous switch coupled to said logic section and to said main switch, said synchronous switch that switches in opposition to said main switch.

11. The switching regulator of claim 10 wherein said control circuit further comprises a current reversal comparator coupled to said logic section, said current reversal comparator that produces a signal, said signal that causes said logic section to turn OFF said synchronous switch when the current through said synchronous switch reverses and when said switching regulator operates in Burst Mode.

12. The switching regulator of claim 5 wherein said minimum peak adjustment circuit comprises:

a mode selection input pin that selects the mode of operation for said switching regulator and that sets the burst threshold level;

a mode comparator that receives a signal from said mode selection input pin, said mode comparator that provides an output signal indicative of the signal from said mode selection input pin, said output signal that is supplied to said logic section; and a transmission gate comprising transistors, said transmission gate coupled to said mode selection input pin and to a clamping circuit, the gates of said transmission gate transistors that receive input signals dependent on said output signal from said mode comparator, said transmission gate that provides said clamping circuit with a burst threshold level when said switching regulator operates in Burst Mode.

13. The switching regulator of claim 5 wherein said minimum peak adjustment circuit comprises:

a mode selection input pin that selects the mode of operation for said switching regulator;

a mode comparator that receives a signal from said mode selection input pin, said mode comparator that provides an output signal indicative of the signal from said mode selection input pin, said output signal that is supplied to said logic section; and a burst threshold level selection pin that selects the burst threshold level when said switching regulator operates in Burst Mode, said burst threshold level selection pin coupled to a clamping circuit.

14. The switching regulator of claim 1 wherein said switching regulator is a step-up regulator.

15. The switching regulator of claim 14 wherein said switching regulator is a non-synchronous switching regulator.

16. The switching regulator of claim 14 wherein said switching regulator is a synchronous switching regulator.

17. The switching regulator of claim 14 wherein said control circuit comprises:

a logic section;

an inductor coupled to said input terminal and to said output terminal; and a main switch coupled to said logic section, said main switch that is controlled by said logic section.

18. The switching regulator of claim 17 wherein said control circuit further comprises a diode coupled to a node that connects said inductor and said main switch and to said output terminal.

19. The switching regulator of claim 17 wherein said control circuit further comprises an oscillator coupled to said logic section, said oscillator that provides an oscillatory signal to said logic section.

20. The switching regulator of claim 17 wherein said control circuit further comprises an error amplifier coupled to said output terminal, said error amplifier that adjusts its output voltage depending on load conditions.

21. The switching regulator of claim 17 wherein said control circuit further comprises:
 a current comparator coupled to said logic section, said current comparator that produces a signal, said signal that instructs said logic section to turn OFF said switching element when a sense voltage increases above the output voltage of said error amplifier; and
 a current amplifier coupled to said current comparator, said current amplifier that provides said current amplifier with a sense voltage indicative of the current that flows through said inductor.

22. The switching regulator of claim 17 wherein said control circuit further comprises a burst comparator coupled to said logic section, said burst comparator that produces a signal, said signal that causes said switching regulator to enter into sleep mode when the voltage output from said error amplifier drops below a burst threshold level.

23. The switching regulator of claim 17 wherein said minimum peak adjustment circuit comprises:
 a mode selection input pin that selects the mode of operation for the regulator and sets the burst threshold level;
 a mode comparator that receives a signal from said mode selection input pin, said mode comparator that provides an output signal indicative of the signal from said mode selection input pin, said output signal that is supplied to said logic section; and
 a transmission gate comprising transistors, said transmission gate coupled to said mode selection input pin and to a clamping circuit, the gates of said transmission gate transistors that receive input signals dependent on said output signal from said mode comparator, said transmission gate that provides said clamping circuit with a burst threshold level when said switching regulator operates in Burst Mode.

24. The switching regulator of claim 17 wherein said minimum peak adjustment circuit comprises:
 a mode selection input pin that selects the mode of operation for said switching regulator;
 a mode comparator that receives a signal from said mode selection input pin, said mode comparator that provides an output signal indicative of the signal from said mode selection input pin, said output signal that is supplied to said logic section; and
 a burst threshold level selection pin that selects the burst threshold level when said switching regulator operates in Burst Mode, said burst threshold level selection pin coupled to a clamping circuit.

25. In a step-down switching regulator that provides an output current to a load at a regulated voltage, a method for varying the minimum peak inductor current level for said switching regulator when operating in Burst Mode, the method comprising:
 coupling an input terminal to a source of input supply voltage;
 coupling an output terminal to said load;
 regulating said output current to said load;
 providing an adjustable burst threshold level, said burst threshold level controlling said minimum peak inductor current level; and
 causing said switching regulator to enter into sleep mode when a control voltage level drops below said burst threshold level.

26. The method of claim 25 wherein said burst threshold level is adjustable through the use of a single mode selection input pin, said switching regulator operating in Burst Mode, said method comprising selecting the mode of operation for said switching regulator and setting the burst threshold level based on a signal from a single mode selection input pin.

27. The method of claim 25 wherein said burst threshold level is adjustable through the use of two separate mode selection input pins, said switching regulator operating in Burst Mode, said method comprising:
 selecting the mode of operation for said switching regulator based on a signal from a single mode selection input pin; and
 setting the burst threshold level for said switching regulator based on a signal from a burst threshold level selection input, said burst threshold level selection pin coupled to a clamping circuit.

28. In a step-up switching regulator that provides an output current to a load at a regulated voltage, a method for varying the minimum peak inductor current level for said switching regulator when operating in Burst Mode, the method comprising:
 coupling an input terminal to a source of input supply voltage;
 coupling an output terminal to said load;
 regulating said output current to said load;
 providing an adjustable burst threshold level, said burst threshold level controlling said minimum peak inductor current level; and
 causing said switching regulator to enter into sleep mode when a control voltage level drops below said burst threshold level.

29. The method of claim 28 wherein said burst threshold level is adjustable through the use of a single mode selection input pin, said switching regulator operating in Burst Mode, said method comprising selecting the mode of operation for said switching regulator and setting the burst threshold level based on a signal from a single mode selection input pin.

30. The method of claim 28 wherein said burst threshold level is adjustable through the use of two separate mode selection input pins, said switching regulator operating in Burst Mode, said method comprising:
 selecting the mode of operation for said switching regulator based on a signal from a single mode selection input pin; and
 setting the burst threshold level for said switching regulator based on a signal from a burst threshold level selection input, said burst threshold level selection pin coupled to a clamping circuit.

* * * * *